Feb. 18, 1958
F. C. HABERLAND
2,823,615
PUMP WITH PRESSURE LOADED BUSHINGS
Filed Dec. 3, 1949
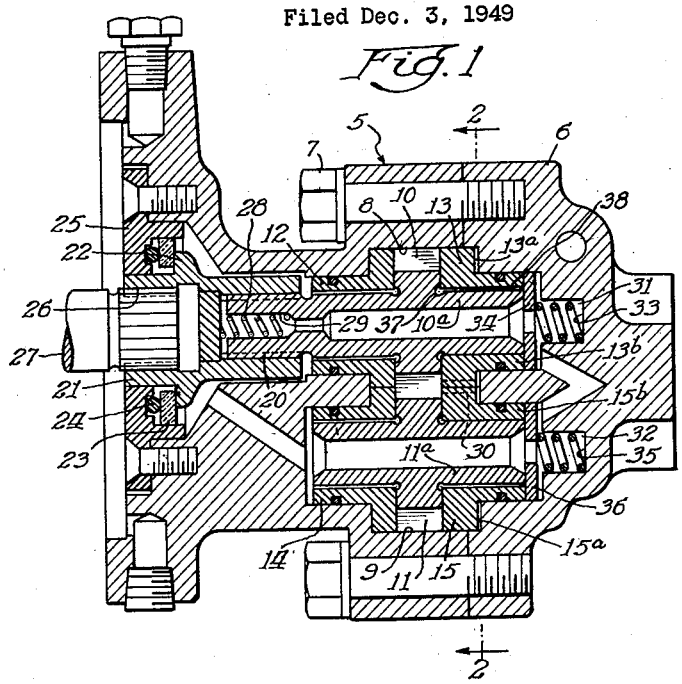
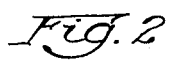
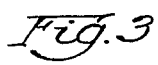
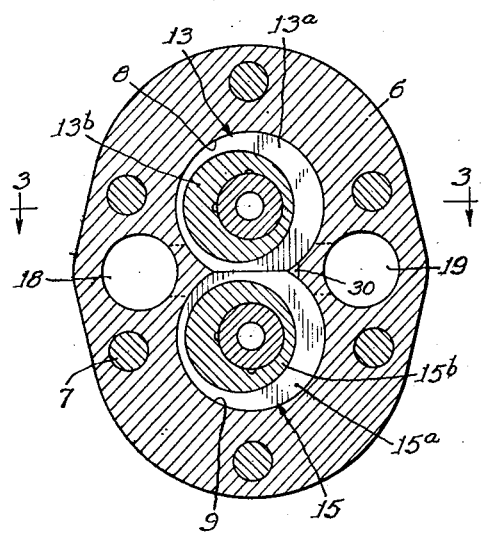
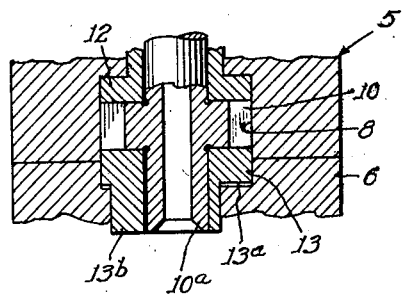
Inventor:
Frederick C. Haberland

2,823,615

PUMP WITH PRESSURE LOADED BUSHINGS

Frederick C. Haberland, Cleveland, Ohio, assignor to Borg-Warner Corporation, Chicago, Ill., a corporation of Illinois Application December 3, 1949, Serial No. 130,904

31 Claims. (Cl. 103—126)

This invention relates to a pressure loaded pump, and more particularly to a pressure loadable bushing for such a pump having a graduated pressure responsive motive surface.

As is well known, in a pressure loaded gear pump of the type including one set of axially movable pressure loadable bushings, a part of the output pressure is applied to the rear or motive surfaces of the axially adjustable bushings to urge said bushings into sealing engagement with their associated gears. As disclosed in U. S. Patent No. 2,420,622 to Roth et al., by carefully selecting the relative areas of the forward surfaces of the bushings and of the motive surfaces of the bushings, it is possible to control within very close limits the actual sealing pressure provided. In practice, this requires a somewhat higher effective pressure in the direction of seal than in the direction tending to open the seal.

In the usual form of pressure loaded pump, the motive or loading chamber to which output pressure is supplied will be uniformly subjected to the output pressure. That is to say, at all points on the motive surfaces at the rear of the bushing, substantially the same pressure will exist. This is not true of the forward surfaces of the bushing, that is, the surfaces adjacent the gear side surfaces. These latter surfaces normally are subjected to a pressure gradient extending from the inlet pressure in the area adjacent the inlet, which is the lowest pressure of the gradient, around to the outlet of the pump at which point the pressure gradient is at its highest level. Accordingly, it will be evident that while the total pressure forces acting on the motive surfaces of the bushing may be made to equal the total pressure forces acting on the forward surfaces of the bushing, or to exceed these latter forces, the pressures acting on particular areas of the forward surfaces will not be uniform and the portion of the bushing surface nearer the inlet will be subjected to a lesser pressure, tending to break the seal, than the portion of the forward bushing surface nearer the outlet of the pump. This unbalanced pressure condition tends to twist the bushing in the pump and results in uneven wear, thereby increasing the power required to turn the pump. Wear is, of course, concentrated on the inlet side of the pump.

It has been found that this unbalanced condition can be to some extent reduced by providing balancing grooves in the gear engaging surfaces of the pressure responsive bushings, these balancing grooves communicating at one end with the discharge side of the pump and extending coaxially of the bushings toward the inlet port of the pump, but terminating short thereof. The balancing grooves tend to render the pressure uniform over a larger area of the gear surface than without the grooves. It will be evident, however, that it is not possible to extend the balancing grooves completely around the pump without providing a leakage path to the inlet side from the outlet side with consequent loss of pressure. Thus, while balancing grooves are helpful, they cannot provide a perfectly balanced pump.

An object of the present invention is to provide a new and improved pressure loaded type intermeshing gear pump.

A further object of the present invention is to provide a pressure loaded type intermeshing gear pump wherein the pressure gradient across the forward surfaces of the axially movable pressure loadable bushings is substantially matched by the pressure gradient across the motive surfaces thereof.

In accordance with one embodiment of this invention, a pressure loaded type intermeshing gear pump having one set of axially movable, pressure loadable bushings may be provided wherein the axially movable bushings are of the flanged, tubular type and the outer diameter of the tubular or journal portion is disposed eccentrically with respect to the inner diameter. The periphery of the barrel portion of each pressure loadable bushing is located nearer the inlet side of the pump than the discharge side and in this manner the area under pressure on the motive surface side of the bushing is greater on the pressure side than on the inlet side of the bearing, thus tending to match the pressure gradient condition on the forward surfaces of the bushing. The pump housing, of course, must be provided with a correspondingly eccentric bushing receiving cavity to accommodate the axially movable bushings.

Other objects and advantages of the present invention will be apparent from the following detailed description taken in conjunction with the drawings wherein:

Fig. 1 is an axial, sectional view of the pressure loadable intermeshing gear type pump having one set of offset bushings arranged in accordance with this invention to provide graduated pressure responsive or loading areas;

Fig. 2 is a transverse, sectional view taken substantially along the line 2—2 of Fig. 1, showing to advantage the eccentric arrangement of the barrels of the bushings; and Fig. 3 is a fragmentary, axial, sectional view taken along the line 3—3 of Fig. 2, showing particularly the housing modification required to accommodate the offset bushings of this invention.

In order to simplify the presentation of this invention, it is shown and described herein in a pressure loaded gear pump of the general type shown and described in U. S. Patent No. 2,420,622, to Roth et al. It will, however, be apparent that the present invention is equally applicable to either vane or gear types of pressure loaded pumps.

Referring now to Fig. 1, a sectional pump housing is there illustrated comprising a main body portion 5 and a right closure or cover member 6. These two sections are securely bolted together as by threaded stud bolts 7 carried by the body portion 5 and threaded into the closure member 6. The two housing sections cooperate to define a pair of parallel, intersecting bores or pump gear chambers 8 and 9, receiving in complementary relationship intermeshing pumping gears 10 and 11 which are rotatably journalled therein. The chambers 8 and 9 are suitably formed to receive and support on either side of the pumping gears 10 and 11 bearing or bushing means 12, 13 and 14, 15, respectively. These bushings are radially flanged at their ends adjacent the gear side surfaces while their tubular body portions or barrels extend in opposite directions away from the pump gears, the body portions providing journal support for the pump gear shafts 10a and 11a. Low pressure liquid is introduced into the pump housing at inlet 18 and high pressure liquid is delivered from the outlet 19, the inlet and outlet passages communicating, respectively, with the inlet and discharge sides of the intermeshing pumping gears. It can be considered that the end plates or flanges of the bushings 12, 13, 14 and 15, together with the outer peripheries of the bores 8 and 9 form a pumping cavity.

In the embodiment illustrated, the upper pumping gear 10 is the driving gear and, accordingly, the left end portion of gear journal 10a is extended to the left to provide an externally splined coupling termination 20. The coupling termination 20 is received in the recessed right end of an internally splined coupling and packing member 21, having a radially extending flange 22 engaging a bearing ring 23, the opposite side of which ring presses against a flexible ring seal 24 retained against a similarly recessed portion of an annular retainer plate 25 mounted on and secured to the left side of housing section 5. Coupling 21 terminates at its outer end in an internally splined connector recess 26 adapted to be engaged in driving relation with an auxiliary power shaft, such as shaft 27, of an aircraft engine or other driving mechanism. Compression spring 28 received in axially extending chamber 29 formed in the coupling termination 20 at the left end of gear shaft 10a tends to urge the coupling member 21 to the left, thus eliminating initial end play and effecting an initial sealed engagement of flange 22, ring 23 and flexible seal 24. In the operation of this pump, the intermediate liquid pressure communicated to the seal, as explained in detail in the above-referred-to Patent No. 2,420,622, is effective to cause the operation of the seal assembly.

It will be noted that the flanged bushings 13 and 15 disposed, respectively, on the right sides of gears 10 and 11 are fitted into the bores 8 and 9 with sufficient clearance to permit slight, axial movement of the bushings with respect to the bores and their associated gears. In the operation of this pump, discharge pressure generated by the intermeshing gears is continuously communicated from the outlet or discharge side thereof to the annular pressure loading chambers defined by the rear flanged surfaces 13a and 15a of the bushings 13 and 15, the adjacent walls of the housing section 6 and the barrel portions of the bushings, through an axially extending passage or conduit 30 formed between the peripheries of the flanged portions of the bushings 13 and 15 on the discharged side of the pump at the point of convergence of the bushings. The passage or conduit 30 extends from the discharge side of the gears to the right, as viewed in Fig. 1, to the intercommunicating portions of the pressure loading chambers at their point of juncture. Initial loading pressure is provided by helically coiled springs 31 and 32, respectively, the spring 31 being associated with the upper bushing 13, and the spring 32 being associated with the lower bushing 15. More particularly, spring 31 has its right portion disposed in a cylindrical recess 33 formed in the cover member 6, and its left end bears against an annular disc 34 disposed in the right end of bore 8 and engaging at its left side of the right end of bushing 13. A similar arrangement is provided for the spring 32, which is disposed in a recess 35 and bears against annular plate 36. As described in U. S. Patent 2,420,622, in order to control the degree of pressure loading a relief recess or chamber 37 may be formed either in the gear side face engaging surface of each pressure loadable bushing or in the gear side face, the relief recess, when formed, being located radially inwardly of the roots of the gear teeth and communicated to a zone of lower than discharge pressure. Communication to a zone of lower than discharge pressure may be provided by an axially extending passage 38 formed in the cylindrical inner wall of each of the pressure loadable bushings.

Since the pump so far described is substantially identical with that shown in U. S. Patent No. 2,420,622, further detailed description of the general features thereof is believed unnecessary.

In the operation of a gear pump of the type here shown, a pressure gradient exists across the face of the bushings 13 and 15 adjacent the gears, the pressure gradient extending from a pressure value equivalent to the inlet pressure of the pump at the inlet side thereof to the discharge pressure of the pump at the outlet side thereof. On the other hand, the pressure loading pressure applied to the surfaces 13a and 15a is substantially uniform over the extent thereof. It will be apparent, therefore, that since the gear side face pressure acting against the loading pressure at the discharge side of the pump far exceeds the gear side face pressure acting against the loading pressure at the inlet side of the pump, the bushings 13 and 15 will tend to engage the gear side faces with a correspondingly greater force adjacent the inlet side. This unbalanced arrangement results in increased wear, and more particularly, uneven wear, resulting in accelerated deterioration of the pump. The present invention overcomes this unbalanced condition.

As may be best seen in Figs. 2 and 3, the periphery of barrel portions 13b and 15b, respectively, of each of the pressure loadable bushings 13 and 15 has its center offset to the left with respect to the axis of the embraced journal 10a or 11a; that is, the outer surface of each bushing barrel is made eccentric with respect to the inner diameter thereof and extends further in the direction of the inlet side of the pump than in the direction of the discharge side. In this manner, the motive area exposed to loading pressure on the inlet side of the bushing is reduced, as compared with the area exposed to pressure on the discharge side of the bushing. Since the force exerted is a function of pressure multiplied by area, the use of a bushing having a motive surface of lesser extent on the inlet side of the pump than on the outlet side of the pump compensates for the uneven pressure, that is, the pressure gradient, acting over the substantially uniform gear side face engaging surface of the bushing. Thus, referring to Fig. 2, it will be evident that the portion of area 13a to the left of the vertical center line of the pump bushing 13 is substantially less in extent than the portion of area 13a disposed to the right of the vertical center line. By regulating the degree of eccentricity or the relative thicknesses of the barrel wall portions on the left and right sides of this center line, it will be readily apparent how the pressure gradient resulting in a non-uniform force against the forward or gear side face engaging surfaces of the bushings 13 and 15 may be largely compensated.

Shifting the center of the barrel periphery to restrict the exposed motive area of the bushings on the inlet side of the pump, of course, requires a modification of the cover or end closure plate 6 of the housing of the pump. Thus, the right portion, as viewed in Fig. 1, of the pump gear receiving chambers 8 and 9 would be equivalently offset to accommodate the offset bushing barrels.

While the barrel portion has been described as tubular, implying a circular or cylindrical periphery it will be evident that while for most manufacturing operations, this configuration is the simplest to achieve, other cross-sectional configurations, such as oval, elliptical or angular, may be employed within the practical limitations of production machinery. It will also be evident that while the present invention has been shown and described in conjunction with an intermeshing gear type pump, the present invention is equally adaptable to vane type pumps of the type wherein discharge pressure is employed to effect a sealing relation between a movable end plate, forming a bearing or bushing member, and the sides of the vanes.

Where herein the various parts of this invention have been referred to as being located in a right or a left position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

What is claimed is:

1. A fluid pump of the type including a housing having an inlet and an outlet port formed therein, a rotatable pumping member journalled in said housing for transferring fluid from said inlet to said outlet, axially movable end plate means adapted to engage said pumping member in sealing relation and movable independently of said rotatable pumping member, a continuous generally annular motive surface on said end plate adapted in response to application of pressure thereto to urge said end plate toward said rotatable member to establish said sealing relation, and conduit defining means for continuously communicating pressure generated by said pump to said motive surface, said motive surface having a generally circular outer periphery concentrically disposed with respect to the axis of rotation of the pumping member and a generally circular inner periphery eccentrically disposed with respect to the axis of said pumping member, said inner periphery having its center offset toward said inlet port.

2. In a pressure loaded type pump, including an axially movable pressure loadable bushing having a motive surface to which loading pressure may be applied and a sealing surface movable with respect to and adapted to engage a gear side face in sealing relation in response to application of pressure generated by the pump to the motive surface area of said bushing, conduit defining means for continuously communicating discharge pressure generated by said pump to said motive surface area to apply loading pressure thereto, means for compensating for the existence during the operation of the pump of a pressure gradient across the gear side face engaging surface of the pump bushing extending from a minimum value adjacent the inlet of the pump to a maximum value adjacent the outlet of the pump whereby to establish a uniform sealing force, said means comprising area defining means arranged so that the area exposed to loading pressure varies substantially as the value of the corresponding oppositely directed pressure force due to pressure generated by the pump and acting on the sealing surface of the bushing varies with the pressure of the pressure gradient at any given point.

3. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an axially adjustable end plate received in said pump chamber and having a rear, continuous motive surface area facing away from said rotatable member and normally spaced from the adjacent end wall of said pump chamber, the inner radial edge of said motive surface area being eccentrically located with respect to the axis of said rotatable member and encircling said axis, said end plate having a second surface area subject to the pressures in said pump chamber and engageable with the adjacent side face of said rotatable member to provide a pumping seal therewith, said end plate being axially movable with respect to said rotatable member, conduit defining means continuously effective to communicate pressure fluid generated by said rotatable member over the entire area of said motive surface area of said end plate defining means for urging the same in the direction of the adjacent rotatable member face for maintaining a pumping seal therewith, the configuration and disposition of said rear motive surface area being selected with respect to the pressure gradient existing across said second surface area during the operation of the pump so that the resultant forces acting in the direction of the adjacent rotatable member side face correspond substantially to said pressure gradient.

4. A liquid pump comprising a housing having a pump chamber formed therein, said housing having an inlet leading to and an outlet leading from said pump chamber, means including a rotatable member received in said pump chamber effective to force liquid from said inlet out of said housing through said outlet, means defining an axially adjustable end plate received in said pump chamber and having a first, generally annular motive surface area facing away from said rotatable member and normally spaced from the adjacent end wall of said pump chamber, said end plate having a second oppositely disposed generally annular surface area concentric with the axis of said rotatable member subject to the pressures in said pump chamber and engageable with the adjacent side face of said rotatable member to provide a pumping seal therewith, said end plate being axially movable with respect to said rotatable member, conduit defining means continuously effective to direct pressure liquid generated by said rotatable member to said first surface of said end plate defining means for urging the same in the direction of the adjacent rotatable member side face for maintaining a pumping seal therewith, the center of area of said first surface area being eccentrically located with respect to the axis of said rotatable member and with respect to the center of area of said second surface area to compensate for the pressure gradient across said second surface area.

5. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an axially adjustable end plate received in said pump chamber and having a first, continuous annular motive surface area facing away from said rotatable member and normally spaced from the adjacent end wall of said pump chamber, said end plate having a second oppositely disposed surface area subject to the pressure generated by operation of said pump in said pump chamber and engageable with the adjacent side face of said rotatable member to provide a pumping seal therewith, said end plate being axially movable with respect to said rotatable member, conduit defining means continuously effective to direct pressure fluid generated by said rotatable member to said first surface of said end plate defining means for urging the second surface in the direction of the adjacent rotatable member side face for maintaining a pump seal therewith, the center of area of said first surface area being offset transversely with respect to the center of area of said second surface area so that the greater portion of said first surface area is disposed adjacent the discharge side of said pump and the lesser portion of said first surface area is disposed adjacent the inlet of said pump.

6. In a pressure loaded pump of the type comprising a housing having an inlet and an outlet formed therein, a pumping gear in said housing, an axially movable pressure loadable bushing having a sealing surface and a motive surface formed thereon, said bushing being movable with respect to said gear, said sealing surface being adapted to engage a side face of said gear in sealing relation in response to application of loading pressure to said motive surface, conduit defining means for communicating loading pressure generated by said pump continuously to said motive surface and motive surface area defining means integral with said bushing for restricting the area of the motive surface to expose a lesser area of the motive surface to loading pressure on the side adjacent the inlet side of said pump than is exposed adjacent the outlet side of said pump.

7. A gear pump including a housing having an inlet and an outlet, a pair of intermeshing pumping gears rotatably journalled in said housing, a pair of axially movable gear side face sealing bushings disposed in said housing and arranged to engage at their forward terminal surfaces their respective gear side faces, said bushings being axially movable with respect to said gears, a motive surface on each of said bushings oppositely located with respect to said terminal surfaces and responsive to application of pressure thereto to urge said bushings in the direction of said gears to establish a sealing relation conduit defining means for continuously communicating discharge pressure generated by said pump to said motive surfaces and continous motive surface area defining means associated with each of said bushings for restricting the motive surface area exposed to discharge pressure whereby upon application of a uniform pressure to said surface the magnitude of the forces in the direction tending to establish a seal varies gradually and without interruption from a minimum value from the inlet of said pump to a maximum value at the outlet of said pump.

8. A fluid pump comprising a housing having a pump chamber formed therein, said housing having an inlet leading to and an outlet leading from said pump chamber, a pair of intermeshing pumping gears rotatable in said chamber and effective to force fluid from said inlet out of said housing through said outlet, a pair of axially movable, pressure loadable bushings disposed in said housing and arranged to engage at their forward terminal surfaces the associated gear side faces in sealing relation, said bushings being axially removable with respect to said gears, a pressure responsive motive surface on each of said bushings oppositely located with respect to said terminal surfaces and responsive to application of pressure thereto to urge said bushings in the direction of said gears to establish said sealing relation, and conduit defining means continuously effective to direct pressure fluid generated by said gears to said motive surface, each said motive surface being generally annular in configuration but having a substantially less width adjacent the inlet side of said pump than adjacent the outlet side of said pump whereby a lesser area of said motive surface is exposed to loading pressure adjacent the inlet side of said pump.

9. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an end plate axially adjustable with respect to said rotatable member and received in said pump chamber, said end plate having a first surface area facing away from said rotatable member and normally spaced from the adjacent end wall of said pump chamber, said end plate having a second surface area engageable with the adjacent side face of said rotatable member to provide a pumping seal therewith, said second surface area being subject to a pressure gradient extending from a minimum value adjacent the inlet of the pump chamber to a maximum value adjacent the outlet of the pump chamber, conduit defining means continuously effective to direct pressure liquid generated by said rotatable member to the first surface area of said end plate defining means for urging the end plate in the direction of the adjacent gear side face, and area defining means integrally formed with said first surface area, said means integrally formed with said first surface area being located to reduce that portion of the first surface area adjacent the inlet side of said pump whereby a greater portion of said first surface area is exposed to pressure generated by said pump adjacent the outlet side of said pump than adjacent the inlet side of said pump and whereby the sealing force produced in response to application of pressure is made to have a force gradient corresponding substantially to the pressure gradient across the second surface area.

10. In a pressure loadable bushing for establishing a sealing relation with a side face of an associated rotatable pumping member mounted on a shaft journalled in said bushing, said bushing being axially movable with respect to said rotatable pumping member, a sealing surface on said bushing generally concentric with said shaft and said pumping member and adapted to engage said pumping member side face in sealing relation, a unitary pressure responsive motive surface on said bushing oppositely located with respect to said sealing surface and asymmetrically disposed with respect to said sealing surface, said motive surface embracing the axis of said pumping member, and conduit defining means for continuously communicating pressure generated by said pump to said motive surface.

11. A a fluid pump having a suction side, a discharge side, a rotatable pumping member, an axially movable, pressure loadable end plate having a continuous, graduated discharge pressure responsive motive surface, said motive surface having a major area and a minor area, said end plate being movable with respect to said pumping member and engageable at a surface opposite to said motive surface with an adjacent side face of said pumping member in sealing relation, the major area of said motive surface being located on said discharge side and the minor area of said motive surface being located on said suction side, and conduit defining means for continuously communicating pressure generated by said pump to said motive surface.

12. A fluid pump including a housing having an inlet and outlet port formed therein, a rotatable pumping member for forcing fluid from said inlet port out of said housing through said outlet port, a pressure loadable end plate disposed in said housing and axially movable with respect to said pumping member, a first surface formed on said end plate adapted to engage said rotatable pumping member in sealing relation, and a second surface on said end plate arranged in response to application of pressure thereto to urge said first surface into sealing engagement with said pumping member, said second surface having a generally crescent-like configuration, the narrower portions of said crescent-like surface being disposed adjacent the inlet port and the wider portion of the crescent-like surface being disposed adjacent the outlet port whereby upon application of discharge pressure to said second surface a maximum sealing force is exerted adjacent the discharge port, and conduit defining means for continuously communicating pressure generated by said pump to said second surface.

13. In a fluid pump of the type comprising a housing having a pump chamber therein and an inlet leading to and an outlet leading from said pump chamber, pumping means including a pumping gear in said chamber effective to force fluid from said inlet out of said housing through said outlet, a supporting shaft connected to said gear and having a portion extending axially from at least one side thereof, an axially movable pressure-loadable bushing associated with said gear and having an axially extending aperture formed therein to receive said portion of said gear supporting shaft in journalled relation, said bushing having a generally annular sealing surface adapted to move with respect to and to engage said side of said pumping gear in sealing relation and exposed during the operation of the pump to a pressure gradient having a maximum value adjacent the pump outlet and a minimum value adjacent the pump inlet, said bushing having a motive surface formed thereon oppositely disposed with respect to said sealing surface and effective upon application thereto of discharge pressure generated by said pump to tend to move said sealing surface into sealing relation with the adjacent side of said pumping gear, conduit defining means for continuously communicating discharge pressure generated by said pump to said motive surface, said pump being characterized in that the outer periphery of said motive surface is generally concentric with the axis of rotation of said supporting shaft while the inner periphery of said motive surface is eccentric with respect to said axis, the largest radial dimension of said motive surface area exposed to discharge pressure lying adjacent the outlet side of said pump and the smallest radial dimension exposed to discharge pressure lying adjacent the inlet side of said pump to provide a sealing force gradient corresponding to said pressure gradient.

14. A pump according to claim 13 wherein said motive surface substantially embraces the axis of said bushing.

15. A pump according to claim 13 wherein said motive surface is substantially continuous and embraces the axis of said bushing.

16. A pump according to claim 13 wherein said motive surface embraces said bushing axis in spaced relation therefrom, all portions of said motive surface being in communication with each other and thereby exposed to the same value of discharge pressure generated by said pump over the entire area thereof.

17. A liquid pump comprising: a housing having a pump chamber and an inlet leading to and an outlet leading from said pump chamber; means including a rotatable member received in said pump chamber for forcing liquid from said inlet out of said housing through said outlet; an end-plate in said pump chamber movable with respect to said rotatable member and having a back face normally spaced from the adjacent end wall of said pump chamber and having portions cooperable with said housing to provide a pressure chamber, said end plate also having a front face subject to the pressures in said pump chamber and cooperable with the adjacent side face of said rotatable member to provide a pumping seal therewith, one of said two last-mentioned faces having a relief recess formed therein inwardly of its outer periphery to limit the sealing area between said side face and said front face; means establishing communication between said relief recess and said inlet; and conduit defining means continuously providing communication between said pressure chamber at the back face of said end plate and said outlet; the relation of the area of said back face to said sealing area being such that the force due to outlet pressure acting upon said back face of said end plate always slightly exceeds the force due to outlet pressure acting upon said front face of said end plate, whereby to maintain said pumping seal without excessive friction, wear or loss in volumetric efficiency, and area defining means on said back face reducing the area thereof exposed to pump outlet pressure adjacent the inlet side of said pump to a small value as compared with the area thereof adjacent the outlet side of said pump exposed to pump outlet pressure.

18. In a pressure loaded pump of the type comprising a housing having an inlet and an outlet formed therein, a pair of intermeshing pumping gears rotatably journalled in said housing, an axially movable pressure loadable plate associated with each of said gears and having a forward sealing surface thereon adapted to engage the associated gear side face in sealing relation, each plate being axially movable with respect to its associated pumping gear, a motive surface on each plate oppositely disposed with respect to said sealing surface, conduit defining means for continuously communicating pressure generated by said pump to said motive surfaces to urge said plate forward surfaces into said sealing relation, and motive surface area defining means for restricting the area of each said motive surface so arranged that the area thereof exposed to pressure generated by said pump and lying adjacent the outlet of the pump is greater than the area exposed thereof adjacent the inlet side of the pump.

19. In a fluid pump of the type including a housing an inlet and an outlet port formed therein, a rotatable pumping member in said housing for transferring fluid from said inlet to said outlet, axially movable end plate means having a sealing surface engageable with one side of said pumping member in sealing relation, said end plate being axially movable with respect to said pumping member, a motive surface on said end plate oppositely located with respect to said rotatable pumping member engaging surface and adapted in response to application of loading pressure thereto to urge said end plate toward said rotatable member to establish said sealing relation, and conduit defining means for continuously communicating loading pressure generated by said pump to said motive surface, said motive surface being generally annular and having a substantially circular outer periphery concentrically disposed with respect to the axis of rotation of the pumping member, the inner periphery of said motive surface being eccentrically disposed with respect to said axis and having its center offset toward said inlet port whereby said motive surface has a substantially lesser radial dimension adjacent said inlet port than adjacent said discharge port so that upon application of a uniform fluid pressure per unit area to said motive surface a graduated sealing force is provided having a minimum value adjacent said inlet and a maximum value adjacent said outlet.

20. A high pressure pump including a body providing a pumping cavity with an inlet and an outlet, bearing means for said pumping cavity each defining an end plate portion and a tubular bearing portion eccentrically offset relative to said end plate portion toward the inlet of the pump to provide a face outwardly of the pumping cavity on the end plate portion which increases in width toward the pump outlet, said bearing means and said body together forming a chamber behind said end plate portions, and means providing a passage in communication with the pump discharge and said chamber, whereby pressure forces in the pumping cavity tending to shift the end plate portions away from the pumping cavity will be balanced by pressure forces in said chamber which increase from the inlet to the outlet sides of the pump.

21. In a high pressure pump including a body having a pumping cavity with an inlet and an outlet, a bearing means for said cavity having an end plate portion and a tubular bearing portion eccentrically displaced relative to said end plate portion toward the inlet of the pump to decrease the extent of exposed plate area in the region of the pump inlet, said bearing means and said body arranged to define a chamber behind said end plate portion, and means providing a passage in communication with the pump discharge and said chamber, whereby balancing pressure loads are provided on both sides of the plate portion.

22. In a high pressure pump, a housing having an inlet and an outlet and providing a pumping cavity, and a backing plate for said cavity in said housing, said backing plate having a pressure receiving back surface forming together with means including a portion of said housing a pressure control chamber, and means placing said pressure control chamber in pressure communication with said outlet, said back surface increasing proportionately in area from the pump inlet to the pump outlet for balancing unequal pressure forces in the cavity.

23. In a pump, a housing having an inlet and an outlet and providing a pumping cavity, a shiftable plate closing one end of said cavity in said housing and being subject to pressures in the cavity which increase toward the outlet side of the cavity, said shiftable plate forming together with means including a portion of said housing a pressure control chamber adjacent said cavity, and a back face on said shiftable plate forming a wall of said pressure control chamber and having an effective area increasing in size from the inlet to the outlet side of the pump to produce balancing forces urging the plate toward the cavity in proportion to the unequal forces urging the plate away from the cavity.

24. A liquid pump comprising: a housing having a pump chamber and an inlet leading to and an outlet leading from said pump chamber; means including a rotatable member received in said pump chamber for forcing liquid from said inlet out of said housing through said outlet; an end-plate in said pump chamber movable with respect to said rotatable member and having a back face normally spaced from the adjacent end wall of said pump chamber and having portions cooperable with said housing to provide a pressure chamber, said end plate also having a front face subject to the pressures in said pump chamber and cooperable with the adjacent side face of said rotatable member to provide a pumping seal therewith, one of said two last-mentioned faces being formed therein inwardly of its outer periphery to limit the sealing area between said side face and said front face; and conduit defining means continuously providing communication between said pressure chamber at the back face of said end plate and said outlet; the relation of the area of said back face to said sealing area being such that the force acting upon said back face of said end plate always slightly exceeds the force acting upon said front face of said end plate, whereby to maintain said pumping seal without excessive friction, wear or loss in volumetric efficiency, and area defining means on said back face reducing the area thereof exposed to pump outlet pressure adjacent the inlet side of said pump to a small value as compared with the area thereof adjacent the outlet side of said pump exposed to pump outlet pressure.

25. A high pressure pump including a body providing a pumping cavity with an inlet and an outlet, bearing means for said pumping cavity each defining an end plate portion and a tubular bearing portion eccentrically offset relative to said end plate portion toward the inlet of the pump to provide a face outwardly of the pumping cavity on the end plate portion which increases in width toward the pump outlet, said bearing means and said body together forming a chamber behind said end plate portions, means providing a passage in communication with the pump discharge and said chamber, whereby pressure forces in the pumping cavity tending to shift the end plate portions away from the pumping cavity will be balanced by pressure forces in said chamber which increase from the inlet to the outlet sides of the pump, and sealing means around the tubular bearing portion to prevent leakage from said chamber.

26. A high pressure pump including a body providing a pumping cavity with an inlet and an outlet, bearing means for said pumping cavity each defining an end plate portion and a tubular bearing portion eccentrically offset relative to said end plate portion toward the inlet of the pump to provide a face outwardly of the pumping cavity on the end plate portion which increases in width toward the pump outlet, said bearing means and said body together forming a chamber behind said end plate portions, means providing a passage in communication with the pump discharge and said chamber, whereby pressure forces in the pumping cavity tending to shift the end plate portions away from the pumping cavity will be balanced by pressure forces in said chamber which increase from the inlet to the outlet sides of the pump, and spring loading means for initially urging the bearing means toward the pumping cavity.

27. A high pressure pump including a body providing a pumping cavity with an inlet and an outlet, bearing means for said pumping cavity each defining an end plate portion and a tubular bearing portion eccentrically offset relative to said end plate portion toward the inlet of the pump to provide a face outwardly of the pumping cavity on the end plate portion which increases in width toward the pump outlet, said bearing means and said body together forming a chamber behind said end plate portions, means providing a passage in communication with the pump discharge and said chamber, whereby pressure forces in the pumping cavity tending to shift the end plate portions away from the pumping cavity will be balanced by pressure forces in said chamber which increase from the inlet to the outlet sides of the pump, sealing means around the tubular bearing portion of said bearing means, and spring loading means for initially urging the bearing means toward the pumping cavity.

28. A high pressure gear pump comprising, in combination, a body and cover forming a pumping chamber having an inlet and an outlet communicating therewith, a driver and a driven gear housed in said pumping chamber, bearing end plates in one end of said chamber, each having end plate portions and tubular bearing portions concentrically aligned relative to one another, pressure loaded bearing end plates in the other end of said chamber having end plate portions and tubular bearing portions eccentrically offset relative to the end plate portions and towards the pump inlet, spring loading means between said cover and said pressure loaded end plates, said pressure loaded bearing end plates and said cover arranged in spaced alignment to provide a pressure chamber behind said end plate portions, means providing a passage in communication with the pump discharge and transmitting a pressure load to the end plate portions of said bearing end plates, sealing means around the tubular bearing portions of said high pressure bearing end plates, and a housing portion on said body providing a seal chamber.

29. A high pressure gear pump comprising, in combination, a body and cover forming a pumping chamber having an inlet and an outlet communicating therewith, a driver and a driven gear housed in said pumping chamber, bearing end plates in one end of said chamber, each having end plate portions and tubular bearing portions concentrically aligned relative to one another, pressure loaded bearing end plates in the other end of said chamber having bearing end plate portions and eccentrically displaced tubular bearing portions offset with respect to said end plate portions towards the pump inlet, spring loading means seated in said cover and engaging said pressure loaded end plates, said pressure loaded bearing end plates and said cover spaced to provide a pressure chamber behind said end plate portions, means providing a passage in communication with the pump discharge and transmitting a pressure load to the end plate portions of said bearing end plates, sealing means around the bearing portions of said high pressure bearing end plates, and a housing portion on said body providing a seal chamber, said driven gear having a hollow bore communicating the low pressure maintained in said seal chamber to the back end of the high pressure bearing end plates to eliminate formation of high pressure pockets.

30. A high pressure gear pump comprising a body having a seal chamber formed in a portion thereof, said body being further provided with an inlet and an outlet, a cover for said body having an inlet and outlet and having spring recesses formed therein, said body and said cover together providing a gear cavity, bearing end plates in the body end of said gear cavity, each having end plate portions and tubular bearing portions concentric therewith, bearing end plates in the cover end of said gear cavity, each having end plate portions and eccentrically disposed tubular bearing portions offset relative to said end plate portions toward said inlet, sealing means around the bearing portions of said cover and bearing end plates, a driver gear journaled in said bearing end plates, a driven gear having a hollow bore journaled in said end plates for meshing engagement with said driver gear, apertured spring retainers abutting the cover and bearing end plates, springs on said retainers seated in the recesses of said cover for initially loading said cover end bearing end plates, a pressure chamber between said sealing means and formed between said end plate portions and said cover, means providing a passage between said pressure chamber and the pump discharge, said body having a bore between said seal chamber and pump inlet, a driver splined to said driver gear and extending outwardly through said seal chamber and sealing means surrounding said driver in said seal chamber.

31. A high pressure pump including a housing having a pumping cavity with an inlet and an outlet and a shaft seal chamber, gears in said cavity, a driven shaft extending from one gear through the seal chamber, a shaft seal in said seal chamber and cooperating with said shaft, integral bearing end plates, each defining a tubular bearing extension and an annular end plate portion which increases in width as it approaches the pump outlet region, said end plate portion and said housing together forming a pressure chamber behind said end plate portions, means providing a passage in communication with the pump discharge and said chamber to load the annular end plate portion and balance the pressure loads on the opposite side thereof, sealing means fitted between the eccentrically displaced bearing portions and said housing and coacting to seal off said pressure chamber, a passage from the high pressure side of the seal chamber to the bearing portion end of said bearing end plates, and a relief passage joining said high pressure side of the seal chamber with the inlet.

References Cited in the file of this patent

UNITED STATES PATENTS

| | | |
|---|---|---|
| 1,051,360 | Wisdom | Jan. 21, 1913 |
| 1,171,347 | Morse | Feb. 8, 1916 |
| 1,620,261 | Kennedy | Mar. 8, 1927 |
| 1,673,259 | Meston et al. | June 12, 1928 |
| 1,780,109 | Berglund | Oct. 28, 1930 |
| 1,795,579 | Storey | Mar. 10, 1931 |
| 1,909,418 | Norwood | May 16, 1933 |
| 1,972,632 | Patton | Sept. 4, 1934 |
| 2,044,873 | Beust | June 23, 1936 |
| 2,095,168 | Burghauser | Oct. 5, 1937 |
| 2,111,883 | Burghauser | Mar. 22, 1938 |
| 2,312,655 | Lauck | Mar. 2, 1943 |
| 2,338,065 | Ungar | Dec. 28, 1943 |
| 2,405,061 | Shaw | July 30, 1946 |
| 2,420,622 | Roth et al. | May 13, 1947 |
| 2,444,165 | Lauck | June 29, 1948 |

FOREIGN PATENTS

| | | |
|---|---|---|
| 318,871 | Great Britain | Sept. 11, 1929 |
| 551,680 | France | Jan. 11, 1923 |
| 593,620 | Great Britain | Oct. 21, 1947 |